United States Patent
Cleary, Jr. et al.

(10) Patent No.: US 7,968,021 B2
(45) Date of Patent: Jun. 28, 2011

(54) COEFFICIENT OF THERMAL EXPANSION CONTROL STRUCTURE

(75) Inventors: William Russell Cleary, Jr., Mansfield, TX (US); Casey Grant Litaker, Southlake, TX (US); Todd Leland Newkirk, Hurst, TX (US); Joshua Joseph Doyon, Dallas, TX (US)

(73) Assignee: The Boeing Company, Chicago, IL (US)

( * ) Notice: Subject to any disclaimer, the term of this patent is extended or adjusted under 35 U.S.C. 154(b) by 686 days.

(21) Appl. No.: 11/831,800

(22) Filed: Jul. 31, 2007

(65) Prior Publication Data

US 2009/0035406 A1 Feb. 5, 2009

(51) Int. Cl.
*F16D 1/00* (2006.01)
(52) U.S. Cl. ............... 264/36.1; 264/36.22; 264/487
(58) Field of Classification Search .............. 425/11, 425/110; 264/487, 510, 30, 36.1, 36.11, 264/36.15, 36.22; 403/28, 29, 30
See application file for complete search history.

(56) References Cited

U.S. PATENT DOCUMENTS

| 3,528,206 A | | 9/1970 | Baird | |
|---|---|---|---|---|
| 3,675,376 A | * | 7/1972 | Belew | 52/1 |
| 4,074,473 A | * | 2/1978 | Nelson | 52/1 |
| 4,214,406 A | * | 7/1980 | Wittmann et al. | 52/1 |
| 4,282,688 A | * | 8/1981 | Krim | 52/1 |
| 4,975,014 A | | 12/1990 | Rufin et al. | |
| 5,084,219 A | | 1/1992 | Sigur | |
| 5,242,523 A | * | 9/1993 | Willden et al. | 156/285 |
| 5,282,734 A | * | 2/1994 | Pastureau et al. | 425/393 |
| 5,368,807 A | * | 11/1994 | Lindsay | 264/510 |
| 5,451,377 A | * | 9/1995 | Asher et al. | 428/167 |
| 5,746,553 A | * | 5/1998 | Engwall | 409/132 |
| 6,217,000 B1 | * | 4/2001 | Younie et al. | 249/184 |
| 6,310,131 B1 | | 10/2001 | Tan | |
| 6,352,071 B1 | | 3/2002 | Kononchuk et al. | |
| 6,673,279 B2 | | 1/2004 | Gardner | |
| 6,759,002 B1 | | 7/2004 | Engwall et al. | |
| 6,849,098 B1 | | 2/2005 | Joseph et al. | |
| 7,169,465 B1 | | 1/2007 | Karandikar et al. | |

OTHER PUBLICATIONS

International Search Report and Written Opinion issued for PCT/US2008/071030; Dated: Sep. 26, 2008; 10 Pages.
Chenson Dong, et al., "Dimension Variation Prediction for Composites with Finite Element Analysis and Regression Modeling," Science Direct, Composites: Part A: applied science and manufacturing 35 (2004), pp. 735-746.

* cited by examiner

*Primary Examiner* — Yogendra N Gupta
*Assistant Examiner* — Emmanuel S Luk
(74) *Attorney, Agent, or Firm* — Yee & Associates, P.C.; Eric K. Satermo

(57) ABSTRACT

The present invention is directed to the incorporation of a substructure into tooling for constructing composite structures in order to control thermal expansion of the tooling during aerospace manufacturing processes. Substructure, such as headers and/or gussets is added to the tooling to constrain the growth of the laminate expansion and/or control the diametric growth of the tool during the curing cycle. The thickness of the face-sheet of the tooling also may be reduced in order to further reduce the effective coefficient of thermal expansion (CTE) of the tooling.

14 Claims, 2 Drawing Sheets

COEFFICIENT OF THERMAL EXPANSION CONTROL STRUCTURE

TECHNICAL FIELD

The present invention relates to controlling thermal expansion of a tool during a manufacturing process, and more specifically, to reducing the effective coefficient for thermal expansion for mandrels during an aerospace manufacturing process.

BACKGROUND OF THE INVENTION

It is commonly known that materials expand and contract with changes in temperature. A commonly used quantifier of this natural phenomenon is the coefficient of thermal expansion or CTE. Generally, CTE can be thought of as a ratio of the change in length of a line segment in a body per unit of temperature change to its length at a reference temperature. When a material is heated, its linear dimensions increase approximately in proportion to the temperature. Over moderate changes in temperature, the length of a material changes by an amount:

$$\Delta L = L_o \alpha (\Delta T)$$

where $\Delta$ (delta) indicates "change in", T is temperature (in degrees Fahrenheit), and L is length (in inches). The constant $\alpha$ is called the coefficient of thermal expansion (typically measured in $10^{-6}$ in./in. °F.), and $L_o$ is the initial length, before expansion (in inches). Consideration of the CTEs of materials used in aerospace applications is important as high temperature swings may occur both in the manufacturing process as well as when the materials are put in use. Under ideal circumstances, the part being manufactured and the tool used to manufacture the part would be comprised of a similar or the same material because the CTEs would match, and thus the tool and the part being formed would preferably expand and contract at the same rate with any temperature changes. However, this commonality of CTEs is not always practically achievable.

Dissimilar materials typically have different CTEs, and the union of dissimilar materials can impart a residual thermal loading effect between the materials, as they will expand and contract at different rates. A mismatch in the CTEs of the part and the tooling used to form the part will often result in complications for maintaining dimensional accuracy. For example, if a carbon/epoxy part is made using an aluminum tool, that tool may grow as much as 3-4 times as the carbon/epoxy pail during the manufacturing process, accordingly altering the desired dimensions of the part being formed. The carbon/epoxy part will likely cure hard, and when the tool and part are cooled, the aluminum tool may potentially contract (cool back) 3-4 times more than the carbon/epoxy part being formed. This discrepancy in the contraction and expansion due to cooling typically causes the part to experience dimensional mismatches due to the residual thermal loading effect. However, despite these disadvantages, it is often necessary to use different materials for tooling and the parts formed using the tooling in aerospace manufacturing applications because of other advantages that the tooling materials may provide.

In the past, some aerospace applications have utilized carbon/epoxy tooling to form composite parts. It should be appreciated that the thru-plane CTE of a carbon/epoxy mandrel is higher than the in-plane CTE of a carbon/epoxy laminate. As such, the thermal expansion of a mandrel is typically higher than that of a laminate, but this physical property may contribute to ironing out any imperfections in the pail being formed. Accordingly, wrinkling of the part may be minimized upon autoclaving the tooling and part during the manufacturing process. However, problems occur upon cooling the mandrel and the part. Once the combination is cooled, the resultant structure of the part is still smooth (i.e., had little to no visible wrinkling), however, the part experiences undesirable sagging, for example, from the mandrel.

While carbon/epoxy may sometimes be used for tooling, much of the tooling for production of composite aircraft parts is typically constructed from invar alloy, an alloy of iron and nickel including some carbon and chromium. Invar alloy has a similar expansion rate as some composite materials, such as carbon/epoxy, and therefore maintains a close tolerance for dimensional control. While invar tools typically produce a desirable final skin shape for the part being manufactured (i.e., not as much sagging as when carbon/epoxy mandrels are utilized), often the skin laminate is not as preferable in that wrinkles sometimes appear in the part that is formed using the invar tooling. This wrinkling typically results because parts cured on invar tooling may not grow enough to eliminate the bulk factor wrinkles. Accordingly, there exists a need in the art to provide a tool that is able to expand the part enough to address potential problems with wrinkling while also being able to iron out the resultant structure.

One type of tooling is a mandrel. Mandrels produced from carbon/epoxy using traditional methods typically experienced more growth during the tooling process than is desirable, particularly during the autoclave portion of the manufacturing process. The parts formed had an enlarged circumference and radius because the CTE associated with the tooling being used continued to be higher than was preferable due, in part, to the hat radii opening up because of the difference in thru-plane and in-plane CTEs of the carbon/epoxy.

The resultant enlarged circumference and higher CTE of the tooling formed parts that sagged from the mandrels upon conclusion of the autoclaving process. Furthermore, the growth required that shims were needed to hold the part in place during the trimming process. Accordingly, it was determined that use of traditional carbon/epoxy mandrels produced good quality laminates; however the final skin shape may not be as desirable because the radius and circumferential dimensions of the part formed may be too large for use in one-piece barrel aerospace applications.

To address these problems caused by use of composite tooling, it was thought that a smaller tool could be designed such that the tool could experience growth during the manufacturing process. In essence, the shape of tool could be modified so that when the tool expands, it expands to the proper location. However, modifying the size of the tool was not preferable as the expansion of the tool affects the dimensions and overall shape of the part being formed.

Thus, there exists a need to understand what causes the higher-than-expected thermal growth in composite tooling and to determine ways to control the thermal expansion of these tools during the manufacturing process in order to reduce the likelihood that the parts being; formed suffer from sagging or wrinkling. Accordingly, there is a need to control the thermal expansion of composite tooling during an aerospace manufacturing process in order to eliminate the sagging condition experienced by parts formed using such tooling.

BRIEF SUMMARY OF THE INVENTION

The present invention is directed to a system and method for reducing thermal expansion of composite tooling. This system and method preferably comprises incorporating substructure into the composite tooling to constrain diametric growth of the tooling during manufacturing. Embodiments of the substructure incorporated into the tooling preferably include the addition of headers and gussets, reducing the thickness of the face-sheet of the tooling, and/or introducing inner skin into the tooling.

Additional embodiments of the present invention are directed to methods for controlling thermal expansion of a mandrel. This method preferably comprises adding substructure to the mandrel to limit hat wall rotation of the mandrel. Other embodiments of the present invention include incorporating into the mandrel combinations of headers and gussets forming all or a portion of the substructure. In a further embodiment of the present invention, the thickness of a constrained face-sheet of the mandrel may be reduced in order to further reduce thermal expansion of the mandrel. Additional embodiments include incorporating inner skin into the mandrel.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying, out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Aerospace applications have focused more on use of composite materials because they are lightweight, have generally desirable CTEs, and can still be used in demanding environments due to their strength. However, the CTE of these composite materials is sometimes difficult to characterize with a desired level of preciseness due to the fact that composite materials are inherently multi-component systems, and as such, are formed with materials having varied CTEs. Further, the CTE of a specific composite system will be dependent upon the lay-up construction and the composition of materials utilized in forming the system.

in order to produce a part having the desired circumference and radius within the appropriate tolerance range, the coefficient of thermal expansion (CTE) for the tooling utilized in the manufacturing process needs to be controlled. Embodiments of the present invention are directed to the incorporation of extra structure (which may be referred to as substructure for the purposes of the present invention) into composite tooling in order to control thermal expansion of the tooling during an aerospace manufacturing process. Substructure may be added to the tool to constrain the growth of the laminate expansion and/or control the diametric growth of the tool during the curing cycle.

Figure 1:
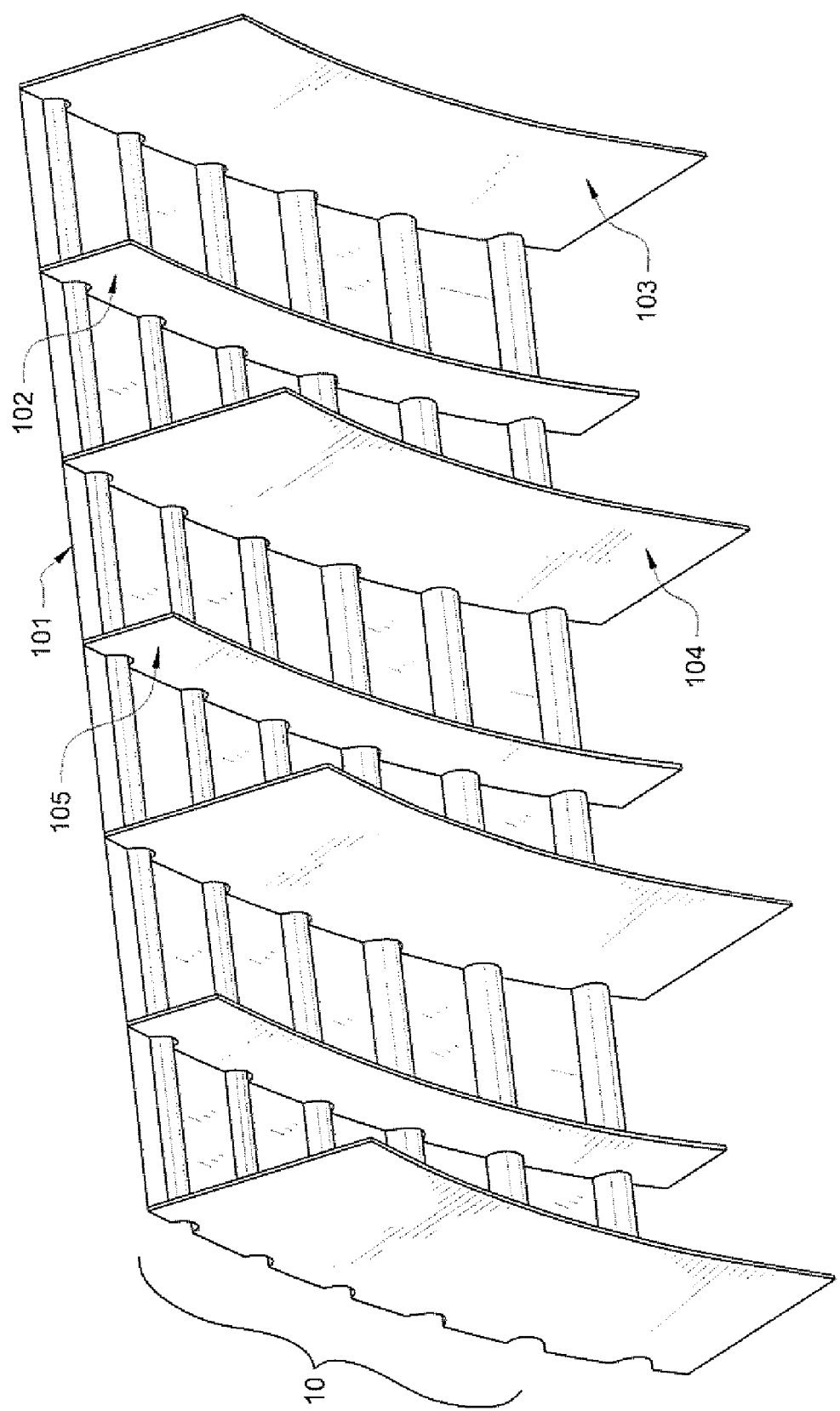
FIG. 1 depicts a cutaway view of tooling incorporating substructure according to an embodiment of the present invention.

Preferably, substructure such as headers or gussets may be designed into the tooling so as to prevent the tooling from experiencing too much growth or generally expanding more than is desirable once it is placed into the autoclave during the process of manufacturing a part, such as a barrel or fuselage section. Turning to FIG. 1, FIG. 1 depicts a cutaway view of tooling 10 incorporating substructure according to embodiments of the present invention. Gussets 102, 105 are preferably placed in the substructure between full-depth headers 103, 104 with the primary purpose of controlling the high effective CTE caused by the difference between thru-plane and in-plane CTEs of the laminate combined with the geometry of tooling 10.

In other embodiments, the face sheet of the tooling may preferably be thinned in order to further control expansion of the tool during the manufacturing process. FIG. 1 includes face-sheet 101 and the thickness of face-sheet 101 may be thinned so as to reduce the effective CTE. This thinning may be the only alteration made to the tooling, but in further embodiments of the present invention, preferably thinning occurs in conjunction with the introduction of other substructure, such as headers 103, 104 and/or gussets 102, 105, as shown in FIG. 1.

Tooling 10 is preferably manufactured in a conventional manner known to one of ordinary skill in the art but substructure is added to the tooling and/or the face-sheet of the tooling is thinned in order to limit hat wall rotation of the tool and accordingly to control the amount of growth of the tool during subsequent manufacturing applications. Accordingly, the inclusion of substructure in the tooling serves to preferably minimize or prevent wrinkles and sagging in the part formed using the tool.

Finite element analysis was performed using Nastran to confirm how the effective CTE of the tooling changes depending on the configuration of the tooling. Analysis was performed, specifically including but not limited to, a CTE sensitivity study to assess assembly behavior in terms of understanding the characteristics of the tooling. The results of the CTE sensitivity study are depicted in Chart 1 as set forth below.

CHART 1

| | In-Plane CTE ($10^{-6}$ in./in. °F.) | Through-thickness CTE ($10^{-6}$ in./in. °F.) | Mid-plane radial change (in.) | Effective CTE ($10^{-6}$ in./in. °F.) | Effective CTE ratio to baseline |
|---|---|---|---|---|---|
| Baseline | 1.6 | 37 | 0.25573 | 8.66 | 1.00 |
| A | 1.6 | 74 | 0.47363 | 16.04 | 1.85 |
| B | 1.6 | 18.5 | 0.14678 | 4.97 | 0.57 |
| C | 3.2 | 37 | 0.29356 | 9.94 | 1.15 |

CHART 1-continued

| | In-Plane CTE ($10^{-6}$ in./ in. ° F.) | Through-thickness CTE ($10^{-6}$ in./ in. ° F.) | Mid-plane radial change (in.) | Effective CTE ($10^{-6}$ in./ in. ° F.) | Effective CTE ratio to baseline |
|---|---|---|---|---|---|
| D | 0.8 | 37 | 0.23682 | 8.02 | 0.93 |
| E | 2.0 | 50.4 | 0.34410 | 11.7 | 1.35 |

Results of CTE sensitivity studies, such as those depicted in Chart 1, show that when the in-plane CTE remains constant while the through-thickness CTE increases, an increase in effective CTE will occur. For example, referring to Chart 1, baseline. A and B all had the same in-plane CTE but different through-thickness CTEs. When the through-thickness CTE of the baseline is doubled (see example A of Chart 1), the effective CTE also effectively doubles as represented in the column of Chart 1 labeled as "effective CTE ratio to baseline." However, when the through-thickness CTE of the baseline is reduced by one-half (see example B of Chart 1), the effective TIE ratio to baseline experiences a similar reduction of almost one-half. Accordingly, increases in through-thickness CTE cause an increase of effective CTE for the tool.

However, when the through-thickness CTE remains constant but the in-plane CTE is reduced, little variation in the effective CTE ratio to baseline is typically observed (compare C and D of Chart 1). Similarly, when both the in-plane CTE and through-thickness CTE are increased as compared to the baseline, the effective CTE ratio to baseline is not nearly as high as when merely an increase of through-thickness CTE is observed (compare A and E of Chart 1). CTE sensitivity studies accordingly showed that a high through-thickness CTE of the fabric lay-up in the hat wails of the tool results in a higher effective CTE for the tool.

Accordingly, these studies demonstrated that if the through-the thickness CTE of the fabric lay-up in the hat walls of the tool is high, excessive circumferential expansion typically results.

Analysis also was conducted to assess how modification of the face-sheet thickness of the tooling affects the effective CTE of the tool. The face-sheet thickness was varied by removing rows of elements; however, in the study, it should be appreciated that no support structure for the tooling was present (i.e., only the face-sheet was present). The results from this study are summarized as shown below in Chart 2.

CHART 2

| | Face sheet thickness (in.) | Mid-plane radius (in.) | Mid-plane radial change (in.) | Effective CTE ($10^{-6}$ in./ in. ° F.) | Effective CTE ratio to Baseline |
|---|---|---|---|---|---|
| Baseline | 0.750 | 103.625 | 0.25573 | 8.66 | 1.00 |
| F | 0.600 | 103.700 | 0.25550 | 8.65 | 0.999 |
| G | 0.450 | 103.775 | 0.25515 | 8.63 | 0.997 |

Accordingly, reduction in thickness of a constrained face-sheet has a favorable impact on the effective CTE.

Other analysis was performed to assess the effect of adding gussets of varying heights with fill direction circumferential to the tooling. When 1 in. tall gussets were incorporated into the tooling, the effective CTE preferably reduces to $4.3 \times 10^{-6}$ in./in. ° F. As taller gussets are preferably added in an embodiment of the present invention, 2 in. tall gussets are preferably incorporated), a further reduction in the effective CTE is preferably achieved (approximately $2.5 \times 10^{-6}$ in./in. ° F.). Incorporating taller gussets into the tooling in conjunction with thinning the face-sheet (for example, reducing the face-sheet thickness from 0.750 in. to 0.450 in. as shown in example G of Chart 2) causes a further reduction in the effective CTE of the tooling (approximately $2.2 \times 10^{-6}$ in./in. ° F.). It should be appreciated that the heights of the gussets incorporated into the tooling should not be limited to the heights that have been specifically addressed, and as such, the height of the gussets may be varied so as to control thermal expansion of the tooling without departing from the objects of the present invention.

As previously described, bending fabric plies into the hat troughs of the tooling results in hat wall rotation during heat-up. Such rotation in the hat walls causes a larger-than-expected thermal expansion of the tooling. Finite element analysis confirmed that this bending of fabric plies into the hat troughs of the tooling results in hat wall rotation during) the autoclave process. Such rotation in the hat walls causes a larger-than-expected thermal expansion of the tooling. Limiting this hat wall rotation by minimizing or eliminating the bends in the fabric preferably reduces the thermal expansion of the tooling. Such elimination provides an appreciable reduction in effective CTE as it serves to prevent high through-the-thickness CTE from pushing the tool around during the manufacturing process. By minimizing the bend in lay-up by machining one side of the tool, the effective CTE may preferably be reduced to $1.9 \times 10^{-6}$ in./in. ° F. Similar impact on the effective CTE is achieved by adding taller headers and gussets as part of the substructure of the mandrel. Accordingly, tooling, may preferably be modified to include thinner face sheets and more and/or taller gussets and headers in order to further control thermal expansion of the tooling.

It should be appreciated that the substructure added may comprise one type of or a combination of substructure as will be shown in embodiments A-D described below. Similarly, thinning of the face-sheets of the tooling also may performed in conjunction with addition of substructure in preferred embodiments so as to further reduce the effective CTE of the tooling. It also should be appreciated that carbon/epoxy mandrels having headers were utilized in each of the embodiments as detailed below, as these types of mandrels are preferable in order to achieve the desired final skin shape and skin smoothness for certain aerospace applications. However, other composite materials may be used to form the tooling and accordingly incorporate substructure and/or thinner face-sheets to control thermal expansion without departing from the objects of the present invention.

Embodiment A

In an embodiment of the present invention, the face-sheet thickness of the mandrel prior to any modifications or addition of substructure was 0.75 in. The face-sheet thickness was then modified and reduced by approximately one-half to a thickness of 0.375 in. In this embodiment, headers (such as headers 103, 104 depicted in FIG. 1) are incorporated as part of the mandrel substructure. The spacing between the headers was originally 36 in. However, the header spacing is preferably modified and reduced by one-third to a distance of 24 in. between headers. By reducing the face-sheet thickness in conjunction with reducing the distance of the header spacing, the effective CTE is preferably reduced from approximately $8.7 \times 10^{-6}$ in./in. ° F. to approximately $3.1 \times 10^{-6}$ in./in. ° F. Accordingly, the effective CTE may preferably be reduced by over 50% based on modifying the header spacing and thinning the face-sheet of the mandrel.

Embodiment B

In a further embodiment of the present invention, headers (such as headers 103i, 104 depicted in FIG. 1) are preferably incorporated into the mandrel. Gussets (such as gussets 102, 105 depicted in FIG. 1) measuring approximately 2 in. tall are then preferably added between the headers. Inclusion of the headers as well as the gussets preferably achieves an effective CTE of approximately $3.0 \times 10^{-6}$ in./in. ° F. This effective CTE is essentially equivalent to that achieved by reducing the face-sheet thickness and header spacing as discussed previously with respect to Embodiment A.

Embodiment C

In yet another embodiment of the present invention, similar to Embodiments A and B, headers (such as headers 103. 104 depicted in FIG. 1) are preferably incorporated as part of the substructure of the mandrel. Also, similar to Embodiment B, gussets (such as gussets 102, 105 depicted in FIG. 1) are preferably added between the headers of the mandrel. However, in this embodiment, gussets taller than those utilized in Embodiment B are incorporated as part of the substructure of the mandrel. In an embodiment of the invention the 2 in. tall gussets of Embodiment B are replaced with 6 in. tall gussets. By incorporating taller gussets into the substructure of the mandrel, the effective CTE may preferably be further reduced to approximately $2.8 \times 10^{-6}$ in./in. ° F.

Embodiment D

In an additional embodiments of the present invention, as discussed with respect to Embodiments B and C, tall gussets are preferably incorporated as part of the substructure of the mandrel. However, in addition, the face-sheet thickness of the mandrel (such as face sheet 101 depicted in FIG. 1) also is preferably reduced. In this embodiment, the face-sheet thickness is approximately 0.45 in. Utilizing such a combination of substructure and a thinner face-sheet, the effective CTE may be preferably reduced to approximately $2.2 \times 10^{-6}$ in./in. ° F.

From Embodiments A-D as described above, it should be apparent that as the face-sheet thickness is preferably reduced, the effective CTE also is preferably reduced. A similar result occurs when the spacing between headers incorporated into the mandrel is reduced. Furthermore, when gussets are preferably inserted between headers incorporated into the mandrel substructure, a further reduction in effective CTE occurs, and as the height of the gussets is preferably increased, a further reduction in effective CTE preferably occurs. It should be appreciated that while embodiments of the present invention have been set forth in Embodiments A-D as described above, the present invention is not limited to the specific combinations of substructure or modifications to the mandrel described above in embodiments A-D.

Figure 2A:
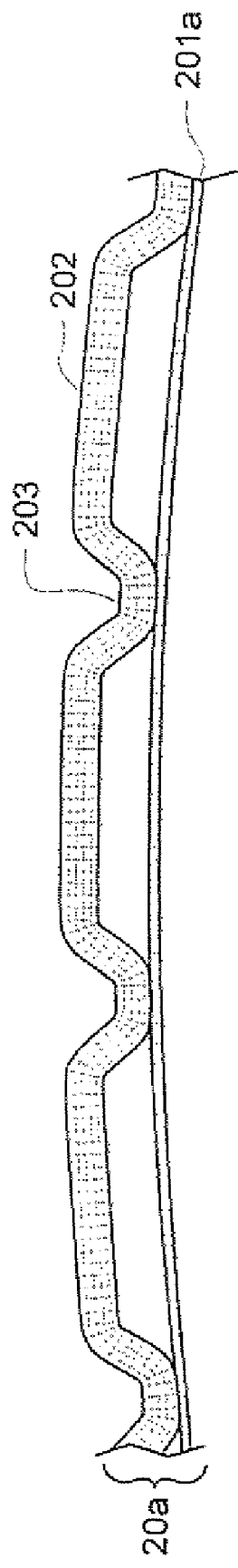
FIG. 2a depicts a view of tooling incorporating substructure according to another embodiment of the present invention.
Figure 2B:
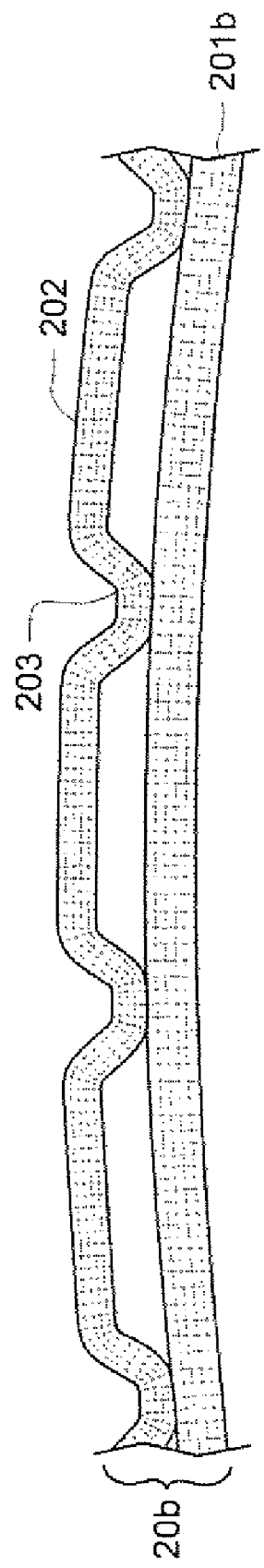
FIG. 2b depicts a view of tooling depicted in FIG. 2a incorporating inner skin according to an embodiment of the present invention.

In addition to or as an alternative to incorporating headers and gussets and/or reducing the face-sheet thickness of the mandrel, inner skin may be preferably incorporated into the hat portions of the mandrel. FIG. 2a depicts tooling 20a which is a baseline tooling, design having baseline 201a where a layer of inner skin may preferably be incorporated into the tooling design. However, FIG. 2b depicts an embodiment of the present invention where tooling 20b incorporates a thicker inner skin 201b. It should be appreciated that incorporating inner skin as part of the tooling may be performed in addition to or as an alternative to modification of the face-sheet thickness, as inner skin typically possesses the same properties as a face-sheet. In order to assess the effect of including inner skin the thickness of the inner skin is modified and the results of such assessment are shown in Table 3 below:

TABLE 3

| Inner skin thickness (in.) | Face-sheet mid-plane radial deflection (in.) | Effective CTE ($10^{-6}$ in./in. ° F.) |
|---|---|---|
| 0.0 (baseline) | 0.25573 | 8.66 |
| 0.2 | 0.12823 | 4.34 |
| 0.4 | 0.10045 | 3.40 |
| 0.6 | 0.08931 | 3.02 |
| 1.0 | 0.08005 | 2.71 |

Table 3 depicted above demonstrates that as the inner skin is incorporated into the tooling and its thickness is increased, the effective CTE of the tooling is preferably progressively reduced. It should be appreciated, however, that while a reduction of the effective CTE by approximately one-half is achieved when the inner skin thickness is incorporated at a thickness of approximately 0.2 in., improvement in effective CTE is less appreciable when the inner skin thickness incorporated into the mandrel increases beyond approximately a 0.2 in. thickness. Similar results are seen when comparing the face-sheet mild-plane radial deflection values as this value decreases at a slower rate once the inner skin thickness increases much beyond 2.0 in.

A summary of the two-dimensional study results with respect to how certain structural arrangements preferably affect the effective CTE of the tooling and accordingly, the effective CTE ratio when compared to a baseline is included in Chart 4 below.

CHART 4

| Structural Arrangement | Effective CTE ($10^{-6}$ in./in. ° F.) | Ratio to Baseline |
|---|---|---|
| Baseline | 8.7 | 1.0 |
| With 1 in. tall gusset | 4.3 | 0.49 |
| With 0.2 in. inner skin | 4.3 | 0.49 |
| With 0.4 in. inner skin | 3.4 | 0.39 |
| With 2 in. tall gusset | 2.5 | 0.29 |
| With 2 in. tall gusset and 0.45 in. thick face sheet | 2.2 | 0.25 |
| Machine one side from laminate | 1.9 | 0.22 |
| Machine both sides from laminate | 1.7 | 0.20 |

Chart 4 shows that the most appreciable reduction in effective CTE occurs when the structural arrangement includes machining both sides from laminate; however, machining may not be preferable in all embodiments of the present invention. Accordingly a similar reduction in effective CTE may preferably be achieved by incorporating gussets into the substructure of the tooling as well as by reducing the thickness of the face-sheet.

Three-dimensional studies also assessed behavior verification when different shapes of material are utilized. Specifically, cube, ring and hat strip models were utilized. Deep headers were incorporated into the solid models to test what displacement resulted based on their inclusion.

The results of the three-dimensional studies confirm that as the thickness of the face-sheet thickness is preferably decreased, a decrease in the mid-plane effective CTE occurs. Similarly, these studies confirmed that as the number of gussets incorporated as part of the substructure of the tool increases, a decrease in the mid-plane effective CTE also results. It should be appreciated, however, that the decrease in mid-plane effective CTE may be less appreciable when the face-sheet thickness is reduced but not as many gussets are incorporated into the substructure of the tooling. Thus, the number of gussets incorporated into the substructure of the tooling may preferably provide a greater contribution to the reduction of the mid-plane effective CTE than the face-sheet thickness; however, both face-sheet thickness and. gussets when utilized in combination result in a preferable decrease of the mid-plane effective CTE.

Carbon/epoxy mandrels incorporating substructures, such as gussets and fill-depth headers, preferably in combination with a thinner face-sheet, provide the features that were lacking from the use of invar and carbon/epoxy tools used in prior aerospace manufacturing applications. The modified carbon/epoxy mandrels of the present invention result in minimal, if any, wrinkling of the part formed using the mandrels. Further, little, if any, sagging occurs when compared to the desired tolerance value. When a part has been cured on an embodiment of the modified tool of the present invention, the tool may be then detached from the part with the resultant part having a good final skin smoothness and preferably matching the desired shape and size for the part. By including gussets as well as headers, preferably the resultant part does not require shimming on the tool for the trim operation. By incorporating headers on a carbon/epoxy composite mandrel, a desired balance is achieved in that it is possible to trim on the mandrel without shims and there are no noticeable wrinkles in the caul sheet seam.

Although the present invention and its advantages have been described in detail it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matters means, methods, or steps.

What is claimed is:

1. A method for controlling thermal expansion of composite tooling, said method comprising:
   providing a composite tooling having a face-sheet;
   selecting coefficient of thermal expansion (CTE) control specific substructure to incorporate into said composite tooling; and
   incorporating said CTE control specific substructure into said composite tooling to constrain said composite tooling to limit a growth of said composite tooling to a predefined growth during manufacturing of a part by said composite tooling, said predefined growth being sufficiently higher than a growth of said part to reduce wrinkling of said part.

2. The method of claim 1, wherein said CTE control specific substructure comprises:
   CTE control specific gussets.

3. The method of claim 1, said method further comprising:
   reducing a thickness of said face-sheet of said composite tooling.

4. The method of claim 3 wherein said CTE control specific substructure of said composite tooling comprises:
   at least one gusset.

5. The method of claim 1 wherein said CTE control specific substructure of said composite tooling comprises:
   at least one header; and
   at least one gusset.

6. The method of claim 5 wherein as a height of said at least one gusset is increased, said thermal expansion of said composite tooling is further controlled.

7. The method of claim 5 wherein said thermal expansion of said composite tooling is further controlled by addition of a plurality of said headers and a plurality of said gussets, said plurality of said gussets disposed between said plurality of said headers.

8. The method of claim 1 wherein incorporating said CTE control specific substructure into said composite tooling comprises:
   incorporating headers into said composite tooling,
   wherein as a spacing between said headers is reduced, said thermal expansion of said composite tooling is further controlled.

9. The method of claim 8, said method further comprising:
   reducing a thickness of said face-sheet of said composite tooling.

10. A method for reducing a coefficient of thermal expansion (CTE) of a composite mandrel, said method comprising:
    providing a composite mandrel having a constrained face-sheet of a predefined thickness; and
    adding a coefficient of thermal expansion (CTE) control specific substructure to said composite mandrel to constrain said composite mandrel to limit a growth of said composite mandrel to a predefined growth during manufacturing of a part by said composite mandrel, said predefined growth being sufficiently higher than a growth of said part to reduce wrinkling of said part.

11. The method of claim 10 wherein adding CTE control specific substructure to said composite mandrel comprises:
    incorporating headers into said composite mandrel; and
    incorporating gussets into said composite mandrel.

12. The method of claim 11, said method further comprising:
    reducing a thickness of said constrained face-sheet of said composite mandrel.

13. The method of claim 10 wherein said CTE control specific substructure of said composite mandrel comprises at least one header and wherein an inner skin is incorporated into said mandrel.

14. The method of claim 10 wherein said CTE control specific composite mandrel is formed from a carbon-epoxy composite material.

* * * * *